3,516,282
DEWPOINT DETECTION APPARATUS
Ian Campbell Leach, Warrandyte, Victoria, and Kevin Howard Sack, Mount Waverley, Victoria, Australia, assignors to Fielden Electronics (Australia) Proprietary Limited, Vermont, Victoria, Australia, a corporation of Australia
Filed Apr. 10, 1967, Ser. No. 629,648
Claims priority, application Australia, Apr. 19, 1966, 4,413/66
Int. Cl. G01n 27/12
U.S. Cl. 73—17      4 Claims

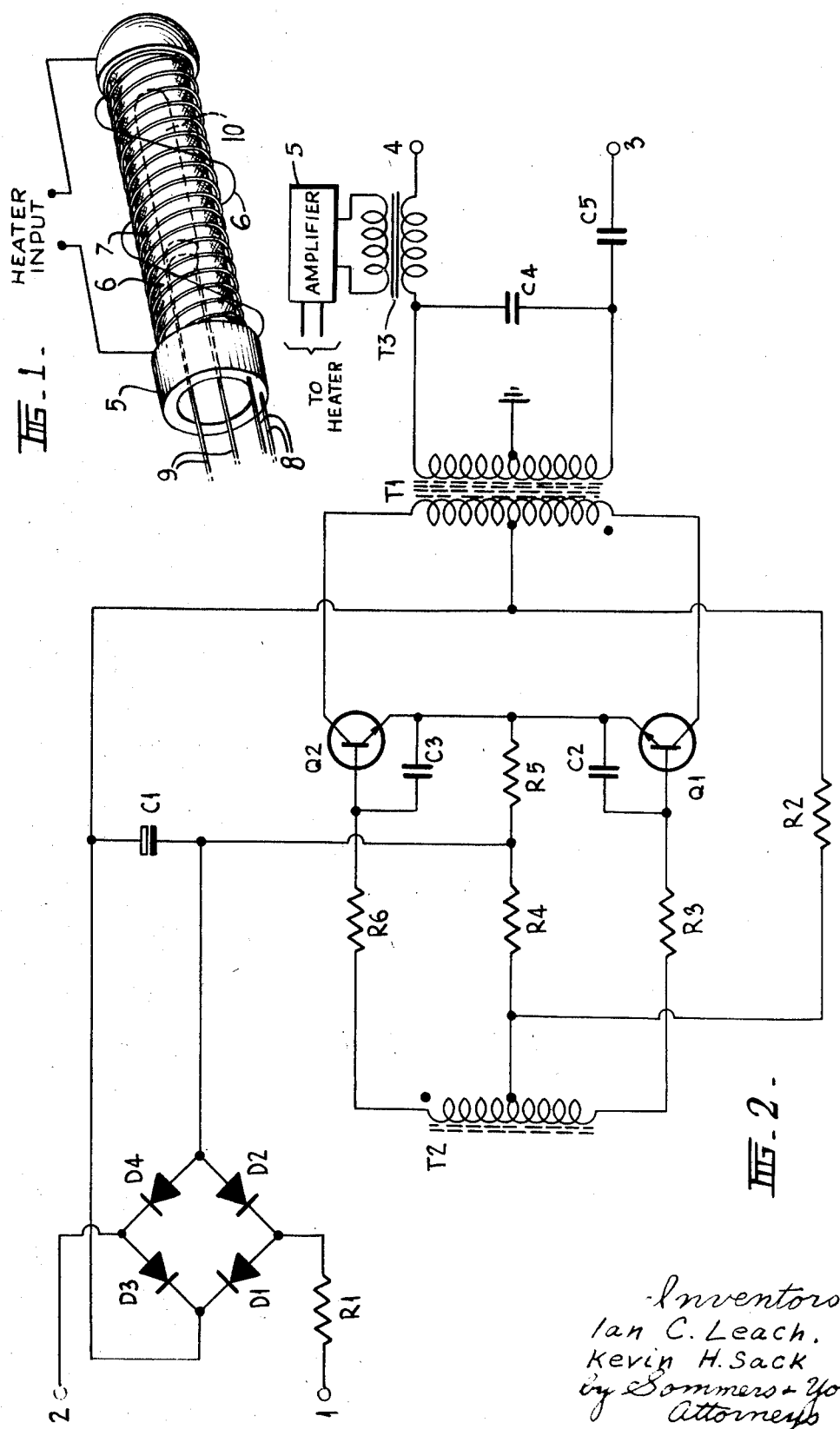

ABSTRACT OF THE DISCLOSURE

Dewpoint detection apparatus of the type in which a pair of electrodes is placed in contact with a compound capable of dissociation in the presence of moisture and with the compound placed within the gas whose dewpoint is to be measured. The electrodes are energized with alternating current energy at a frequency greater than 60 Hz., and a means is provided for blocking the flow of direct current through the compound. A further means which is responsive to the temperature of the compound provides a measure of the dewpoint of the gas.

---

This invention relates to apparatus for detecting the absolute humidity or dewpoint of gases.

The particular known apparatus with which the invention is concerned comprises two electrodes in contact with hydroscopic salt, usually lithium chloride, although other salts can be used, the electrodes being connected to a source of AC current. Water is absorbed by the salt from the surrounding gaseous medium if the relative humidity thereof exceeds the equilibrium relative humidity of the salt with a result that the salt enters into solution and becomes conductive allowing current to flow through the electrodes. Heat generated by the passage of the current alters the temperature of the salt and surrounding gas.

The salt temperature stabilises at or near the temperature at which the heated gas has a relative humidity equal to the equilibrium relative humidity of the salt at the elevated temperature. The salt temperature is measured by any suitable means to yield an indication of the dewpoint temperature of the gaseous medium. Failure has been experienced due to "burn-out" in that type of humidity sensitive element which consists of a hydroscopic salt heated by an AC current. These sensors are often called elements of the lithium chloride type, but will operate with many other salts. One cause of "burn-out" is electrolytic deposition of the electrode material as a result of a DC current flowing in the AC heater circuit. The DC is produced in or by the cell. If the circuit is arranged to have a high DC impedance while still providing a sufficiently low AC impedance to permit operation of the element it has now been found that prevalence of damage due to this phenomena can be very greatly reduced.

It is postulated that the mechanism of failure of the known devices is as follows. After operation for some time, the element can form (perhaps as a result of contaminants) a partial rectifier and a cell which polarises to produce an almost equal and opposite voltage to that developed by the self-rectified AC. With changes in dewpoint, the alternating current and the rectified current vary, but the cell takes a finite time to repolarise and adjust itself to the new value, and during this repolarisation time DC will flow. This leads to deposition of the electrode material across the element. As a result of minute arcing or resistive heat dissipation, fusion of the element components results.

It is accordingly the principal objective of this invention to provide improved dewpoint detection apparatus in which the occurrence of "burn-outs" in the sensors is substantially eliminated.

With the above stated principal objective in view there is provided according to the invention dewpoint detection apparatus comprising a pair of electrodes in contact with a compound capable of dissociation in the presence of moisture, said electrodes being connected with a source of alternating current having a frequency greater than 60 Hz., and a capacitor in the electrode circuit to suppress the development of direct current therein.

Conveniently, means may be provided operable in response to current flow between the electrodes to operate heating means adjacent the compound and associated electrodes to facilitate rapid equilibrium conditions and means for determining the temperature of the compound at equilibrium.

Furthermore, the means operable in response to current flow between the electrodes may be used to produce a correction signal for adjustment of the indicated temperature.

In operation, apparatus according to the invention may be used for the determination of the dewpoint of gaseous atmospheres with a degree of accuracy and stability hitherto unattainable with known apparatus.

A practical arrangement of the invention will now be described with reference to the drawings, in which:

FIG. 1 shows a convention dewpoint sensor, and FIG. 2 is a schematic circuit diagram of a power supply in accordance with the invention.

Referring now to the drawings, the sensor shown in FIG. 1 comprises a small woven fibre glass tube 6, impregnated or coated with lithium chloride, supported on an insulating former 5. The parallel coils 7 of gold wire are wound over the fibre glass each connected via leads 8 with a source of alternating current having a frequency between 1 to 10 kHz. per second, the optimum frequency appearing within the range of 1 to 5 kHz. With structural modifications to the coil and support however, the higher frequencies may be used.

In atmospheres at normal temperatures having a relative humidity below 11.2% the lithium chloride is stable; however, any increase in relative humidity above 11.2% will result in moisture being absorbed by the lithium chloride causing dissociation, with a result that a conductive solution is formed allowing current to flow through the solution and between the coils. This current flow raises the temperature of the lithium chloride, driving out the absorbed moisture until equilibrium is again reached at a higher temperature and current will cease to flow. This temperature from which the dewpoint temperature can be derived is sensed by a temperature sensitive resistor or similar device 10, located within the former 5 and connected with leads 9 with suitable display apparatus.

By using a current supply stabilised against input voltage variations and with a non-linear output impedance, the local heating produced in the sensor can be arranged for rapid expulsion of large quantities of moisture without undesirable overshoot when smaller quantities are encountered. This produces a more stable system, and also reduces the possibility of burn outs occurring in the detector.

In the power supply shown schematically in FIG. 2 terminals 1 and 2 are connected with a 50 Hz. AC supply derived from the normal supply mains. DC current from rectifier assembly D1, 2, 3 and 4 is fed to transistors Q1 and Q2 which with transformer windings T1 and T2 comprise an oscillator circuit having a frequency of about 4 kHz. Voltage at this frequency is fed to the coils 7 on the sensor from the secondary winding of T1 from terminals 3, 4. Capacitor C5 in series with the sensor circuit has a high DC resistance to prevent the development of DC in the secondary circuit while having a capacity of sufficient value to permit the flow of AC to the sensor.

A capacitor C4 is connected in parallel with the secondary circuit. When the sensor is first placed in service, a well defined curing time elapses before stabilisation, the resistance of the sensor being quite low at the start of the curing cycle, with a result that power of low voltage and high current is present in the secondary circuit due to series resonance of the secondary winding of T2 with C5.

As the curing cycle completes and the sensor reaches equilibrium, its resistance increases with a result that power of relatively low current and high voltage is present in the secondary circuit. Capacitor C4 thus is in a state of parallel resonance at the end of the curing cycle and C5 in series resonance at the start of this cycle.

The output impedance of the power supply thus varies in such a way as to produce approximately constant power in the element during the period when excess moisture is being expelled. Approaching equilibrium conditions, the power supply reverts to constant voltage.

Under conditions where the lithium chloride stabilises at temperatures above ambient (as it must under normal operating conditions), heat is lost as a result of the temperature difference. At larger temperature differences, the heat loss is appropriately greater, and the off-set will increase slightly so that additional heating can occur in order that stability may be maintained. This will produce errors depending on the gain of the system and the temperature difference, which can be reduced by lagging the tube in which the temperature sensing element is located and by reducing the air flow past the element. These remedies, however, increase the response time.

To overcome this problem, the current flow to the electrodes in the present invention may be sensed by a current transformer or the like and used to control current fed by amplifier 15 to an auxiliary heater 16 located adjacent the tube and associated electrodes. This has the effect of raising the temperature of the surrounding atmosphere and hence reducing the temperature difference.

The degree of error in the temperature of the element is related to the current drawn by the element. This current can be sensed by a current transformer or similar device and may be rectified and used to produce a resultant signal to apply a correction to the indicated temperature.

This method of using the current as a heat loss compensator, correcting for errors resulting from the difference between element and ambient temperature, when appropriately applied automatically, extrapolates the indicated temperature to the temperature at which no current would flow i.e. the true equilibrium dewpoint temperature.

We claim:
1. Dewpoint detection apparatus for gases comprising, a compound capable of dissociation in the presence of moisture disposed within the gas whose dewpoint is to be measured,
a pair of electrodes in contact with said compound,
a source of alternating-current energy at a frequency which is at least a multiple of the normal mains frequency for energizing said electrodes to thereby heat said compound to an elevated temperature at which the equilibrium relative humidity of said compound is substantially equal to the relative humidity of said gas,
means for blocking the flow of direct current through said compound,
and means responsive to said elevated temperature of said compound for providing a manifestation of the dewpoint of said gas.

2. Apparatus according to claim 1 wherein the frequency of the alternating current source is between 1 and 5 kHz.

3. Apparatus according to claim 1 including auxiliary heating means operable in response to current flowing between the electrodes to raise the temperature of the atmosphere surrounding the electrodes.

4. Dewpoint detection apparatus for gas comprising, a coil forming element impregnated with a compound capable of dissociation in the presence of moisture and disposed within the gas whose dewpoint is to be measured,
a pair of spaced electrodes wound in the form of two coils on said coil forming element for heating said compound to an elevated temperature at which the equilibrium relative humidity of said compound is substantially equal to the relative humidity of said gas,
a solid state oscillator generating an alternating current supply with a frequency in the range of from 1 to 5 kHz. for energization of said electrodes,
a temperature-sensitive element located within said coil forming element,
and means responsive to said temperature-sensitive element for providing a manifestation of the dewpoint temperature of the gas.

References Cited
UNITED STATES PATENTS

| | | | |
|---|---|---|---|
| 2,756,295 | 7/1956 | Schluchter | 200—61.06 |
| 2,987,918 | 6/1961 | Hanng | 73—336.5 |
| 3,022,667 | 2/1962 | Werler et al. | 73—336.5 |
| 2,897,673 | 8/1959 | Wylie. | |

RICHARD C. QUEISSER, Primary Examiner

J. K. LUNSFORD, Assistant Examiner

U.S. Cl. X.R.

73—336.5, 29